US 6,722,380 B1

(12) United States Patent
Hafer

(10) Patent No.: US 6,722,380 B1
(45) Date of Patent: Apr. 20, 2004

(54) UMBRELLA SUPPORT FOR USE WITH A VEHICLE HAVING A HITCH RECEIVER

(76) Inventor: John C. Hafer, 15966 Howard St., Omaha, NE (US) 68118

( * ) Notice: Subject to any disclaimer, the term of this patent is extended or adjusted under 35 U.S.C. 154(b) by 86 days.

(21) Appl. No.: 10/143,224

(22) Filed: May 9, 2002

(51) Int. Cl.[7] .............................. A47B 3/00; B60R 9/06
(52) U.S. Cl. ...................... 135/16; 135/88.03; 224/488; 224/505; 248/514; 280/491.5; 280/415.1
(58) Field of Search ................................ 135/16, 88.08, 135/88.13, 99; 280/491.1, 491.3–491.5, 415.1; 224/502–506, 519–523, 488; 248/511, 514, 518; 296/26.08; 108/44

(56) References Cited

U.S. PATENT DOCUMENTS

| 3,295,473 | A |   | 1/1967  | Wentworth |           |
|-----------|---|---|---------|-----------|-----------|
| 4,013,303 | A | * | 3/1977  | Milner    | 280/491.4 |
| 4,381,069 | A |   | 4/1983  | Kreck     |           |
| 5,226,657 | A | * | 7/1993  | Dolphin   | 280/478.1 |
| 5,431,364 | A |   | 7/1995  | Etter     |           |
| 5,449,101 | A | * | 9/1995  | Van Dusen | 224/506   |
| 5,503,423 | A | * | 4/1996  | Roberts et al. | 280/491.3 |
| 5,518,159 | A | * | 5/1996  | DeGuevara | 224/488   |
| 5,529,231 | A | * | 6/1996  | Burgess   | 224/502   |
| 5,850,843 | A |   | 12/1998 | Mahood et al. |       |
| 5,857,741 | A |   | 1/1999  | Anderson  |           |
| 5,873,595 | A | * | 2/1999  | Hinte     | 280/504   |
| 5,950,617 | A |   | 9/1999  | Lorenz    |           |
| 6,082,269 | A |   | 7/2000  | Padberg   |           |
| 6,189,458 | B1|   | 2/2001  | Rivera    |           |
| 6,227,517 | B1| * | 5/2001  | Wohl      | 248/694   |
| 6,511,088 | B2| * | 1/2003  | Kahlstorf | 280/415.1 |

FOREIGN PATENT DOCUMENTS

JP          59-12055     *  7/1984

* cited by examiner

*Primary Examiner*—Winnie S. Yip
(74) *Attorney, Agent, or Firm*—Thomte, Mazour & Niebergall; Dennis L. Thomte

(57) ABSTRACT

A hitch-mounted umbrella support is provided for use with a vehicle having a hitch receiver at the rearward end thereof. A hitch bar is selectively receivably mounted in the receiver and has a clevis secured to its rearward end. A support bar is selectively adjustably pivotally secured to the clevis and extends therefrom. The inner end of the support bar has a plurality of longitudinally spaced-apart openings formed therein which are adapted to be selectively registered with a plurality of longitudinally spaced-apart openings formed in the clevis. A U-shaped locking pin is extended between the clevis and the support bar to lock the support bar in various positions with respect to the hitch bar. A hollow tube is secured to the outer end of the support bar and receives the pole of the umbrella therein. The umbrella may be pivotally moved from side to side with respect to the vehicle and may be moved towards the vehicle or away from the vehicle.

8 Claims, 4 Drawing Sheets

UMBRELLA SUPPORT FOR USE WITH A VEHICLE HAVING A HITCH RECEIVER

BACKGROUND OF THE INVENTION

1. Field of the Invention

This invention relates to an umbrella support for use with a vehicle having a hitch receiver and more particularly to an umbrella support which may be moved to many different positions with respect to the vehicle so that the umbrella may be used to its full potential.

2. Description of the Related Art

Many types of umbrella supports have been previously provided for supporting or positioning an umbrella adjacent to a vehicle or on the vehicle. U.S. Pat. No. 3,295,473 discloses a bumper-mounted umbrella support, but the same is not pivotally mounted. U.S. Pat. No. 5,857,741 discloses a hitch-mounted umbrella. Although the chairs of the '741 patent can be moved to various locations, the umbrella is fixed in place. U.S. Pat. No. 5,850,843 discloses an adjustable umbrella with the stand thereof being positioned below the wheel of the vehicle. U.S. Pat. No. 6,082,269 discloses a hitch-mounted umbrella, but the umbrella cannot be pivoted from side to side. U.S. Pat. No. 6,189,458 illustrates a hitch-mounted umbrella, but the same is not pivotally mounted about a vertical axis. U.S. Pat. No. 5,950,617 discloses a hitch-mounted umbrella support as well as a rearwardly extending arm which supports a barbeque or the like. In the embodiment of FIG. 1 of the '617 patent, the grill may be pivoted about a vertical axis 3 so as to be movable in the direction of the arrows. In the embodiment of FIG. 11, the umbrella support is positioned at the outer end of the arm 30 and is pivotally mounted about the vertical axis 3, as indicated by the arrows in FIG. 3. Although the '617 patent discloses a hitch-mounted umbrella which may be swung from side to side, the umbrella support of the '617 patent apparently does not have the ability to adjust the spacing of the umbrella with respect to the vehicle in a wide variety of positions nor does the umbrella support of the '617 patent apparently have the ability to have pivotally move the umbrella support to various positions with respect to the vehicle and to lock the same in place.

When an umbrella is positioned at the rear of the vehicle, as illustrated in certain of the prior art patents, the upper end of the umbrella may engage the roof of the vehicle or the rear of the vehicle. Further, once the vehicle has been parked and the umbrella set up, the movement of the sun will change with respect to the vehicle and the umbrella will be less than efficient if the umbrella cannot be moved rearwardly and forwardly with respect to the vehicle and cannot be moved in a side to side manner with respect to the vehicle.

SUMMARY OF THE INVENTION

A hitch-mounted umbrella support for use with a vehicle having a hitch receiver at the rearward end thereof is provided. The umbrella support comprises a substantially horizontally disposed hitch bar which has its inner or forward end selectively received by the hitch receiver. The hitch bar has a plurality of longitudinally spaced-apart openings formed therein which are adapted to be selectively matched with the holes in the hitch receiver so that a locking pin can be inserted therein. An upper clevis element is mounted on the upper outer end of the hitch bar and extends rearwardly therefrom. A lower clevis element is mounted on the lower outer end of the hitch bar and extends rearwardly therefrom. The upper and lower clevis elements have a plurality of longitudinally spaced-apart openings formed therein which register with one another. A horizontally disposed support bar has its inner end received between the upper and lower clevis elements and has a plurality of longitudinally spaced-apart openings formed therein which are adapted to be selectively aligned with the openings formed in the upper and lower clevis elements. A selectively removable hitch pin extends through one of the openings in the upper clevis element, one of the openings in the support bar, and one of the openings in the lower clevis element. A substantially U-shaped locking member is selectively utilized and includes a base portion having first and second spaced-apart pin members extending downwardly therefrom. The first pin member selectively extends downwardly through one of the openings in the upper clevis element. The second pin member selectively extends downwardly through one of the openings in the support bar. The U-shaped locking member locks the support bar against pivotal movement with respect to the hitch bar. A vertically disposed hollow tube is secured to the support bar at the outer end thereof which receives the pole of the umbrella therein. The hitch bar is selectively longitudinally adjustably pivoted to the upper and lower clevis elements to enable the hollow tube at the outer end of the support bar to be pivotally moved to many different positions with respect to the hitch bar and to permit the hollow tube to be selectively moved towards or away from the vehicle.

Although the hitch-mounted support of this invention is ideally suited for supporting an umbrella, which is the preferred embodiment, the vertically disposed hollow tube thereof could also be used for supporting a small table or rack having a tube extending downwardly therefrom into the hollow tube and secured thereto by any convenient means.

It is therefore a principal object of the invention to provide an improved umbrella support for use with a vehicle having a hitch receiver.

A further object of the invention is to provide an umbrella support for use with a vehicle having a hitch receiver including means for selectively pivoting the umbrella to many different positions with respect to the vehicle and to permit the umbrella to be moved towards the vehicle and away from the vehicle.

Still another object of the invention is to provide an umbrella support for use with a vehicle having a hitch receiver which is durable in use and refined in appearance.

Yet another object of the invention is to provide a hitch-mounted support for supporting an umbrella, small table, rack, etc.

These and other objects will be apparent to those skilled in the art.

DESCRIPTION OF THE PREFERRED EMBODIMENT

Figure 1:
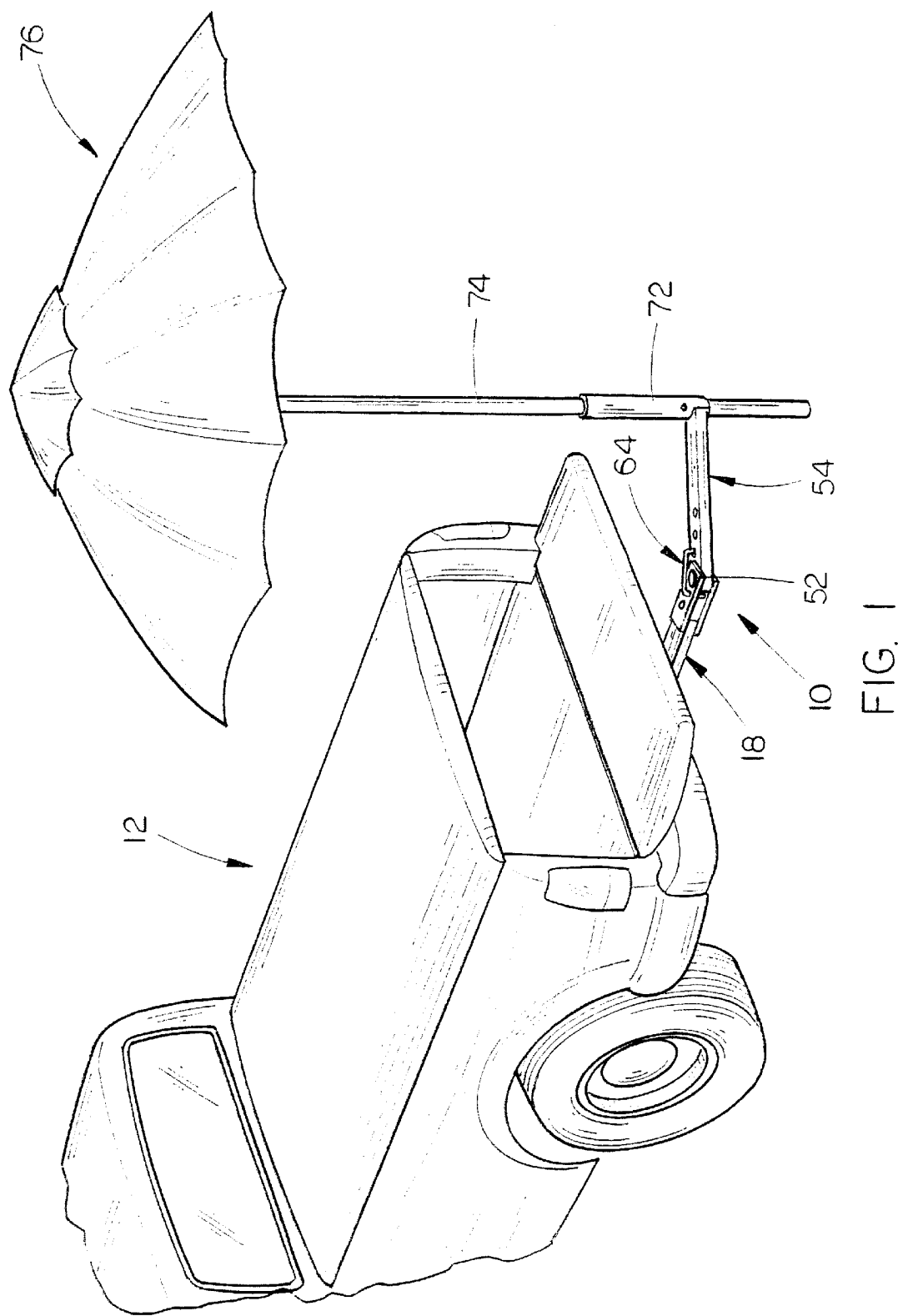
FIG. 1 is a rear perspective view of a vehicle having the umbrella support of this invention secured to the hitch receiver thereof.
Figure 2:
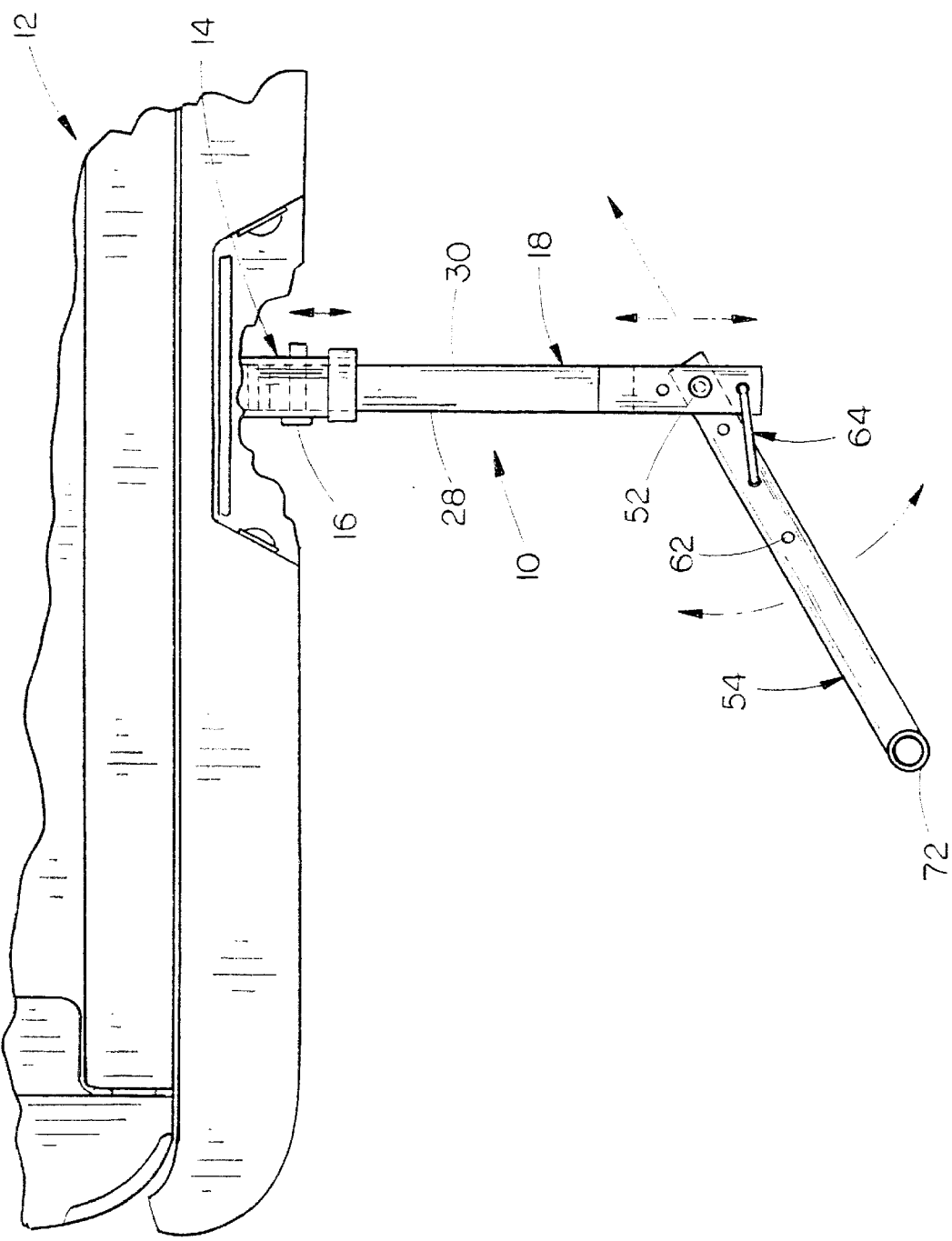
FIG. 2 is a top elevational view of the umbrella support of this invention secured to the vehicle receiver.
Figure 3:
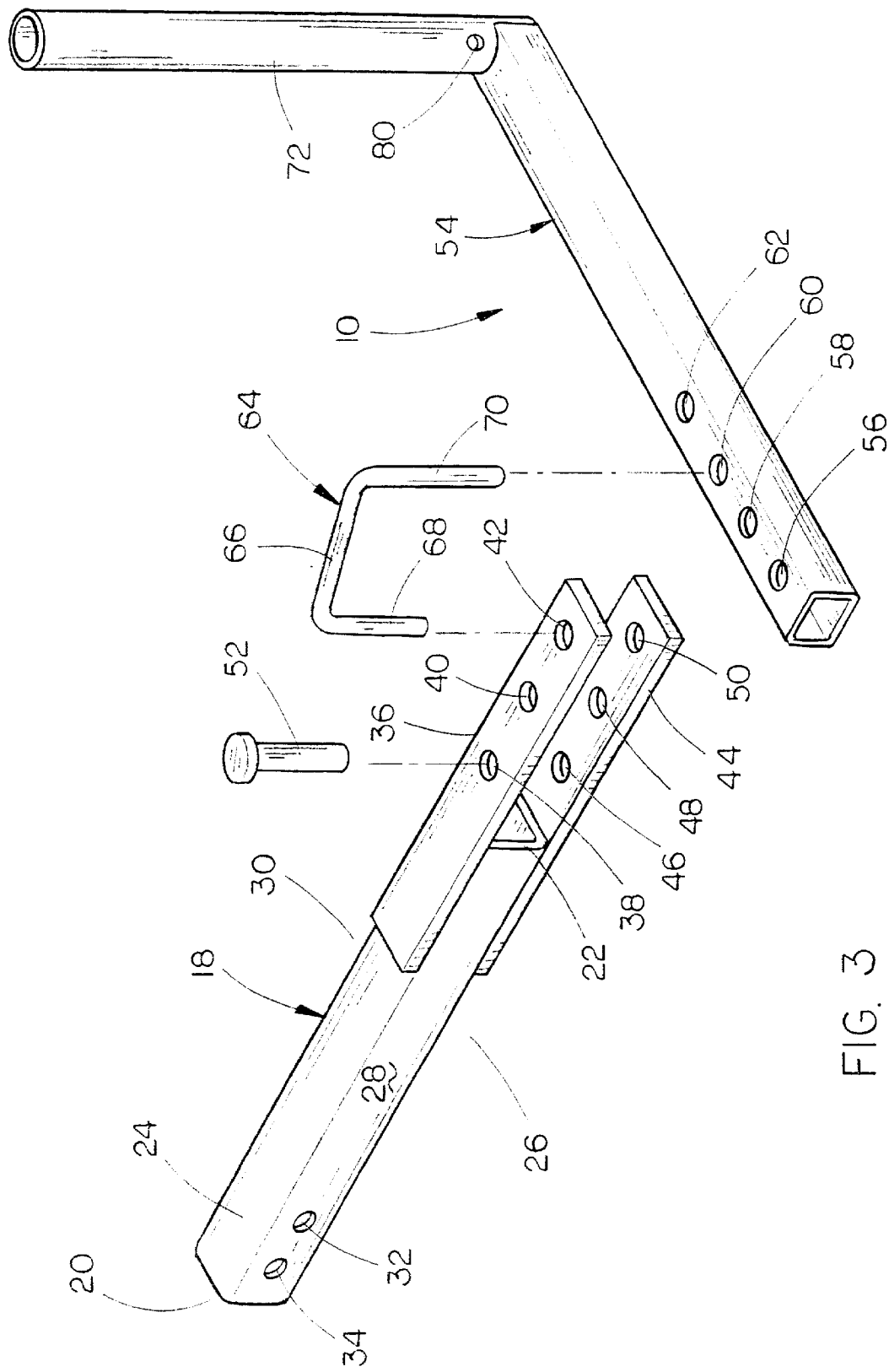
FIG. 3 is an exploded perspective view of the umbrella support of this invention.
Figure 4:
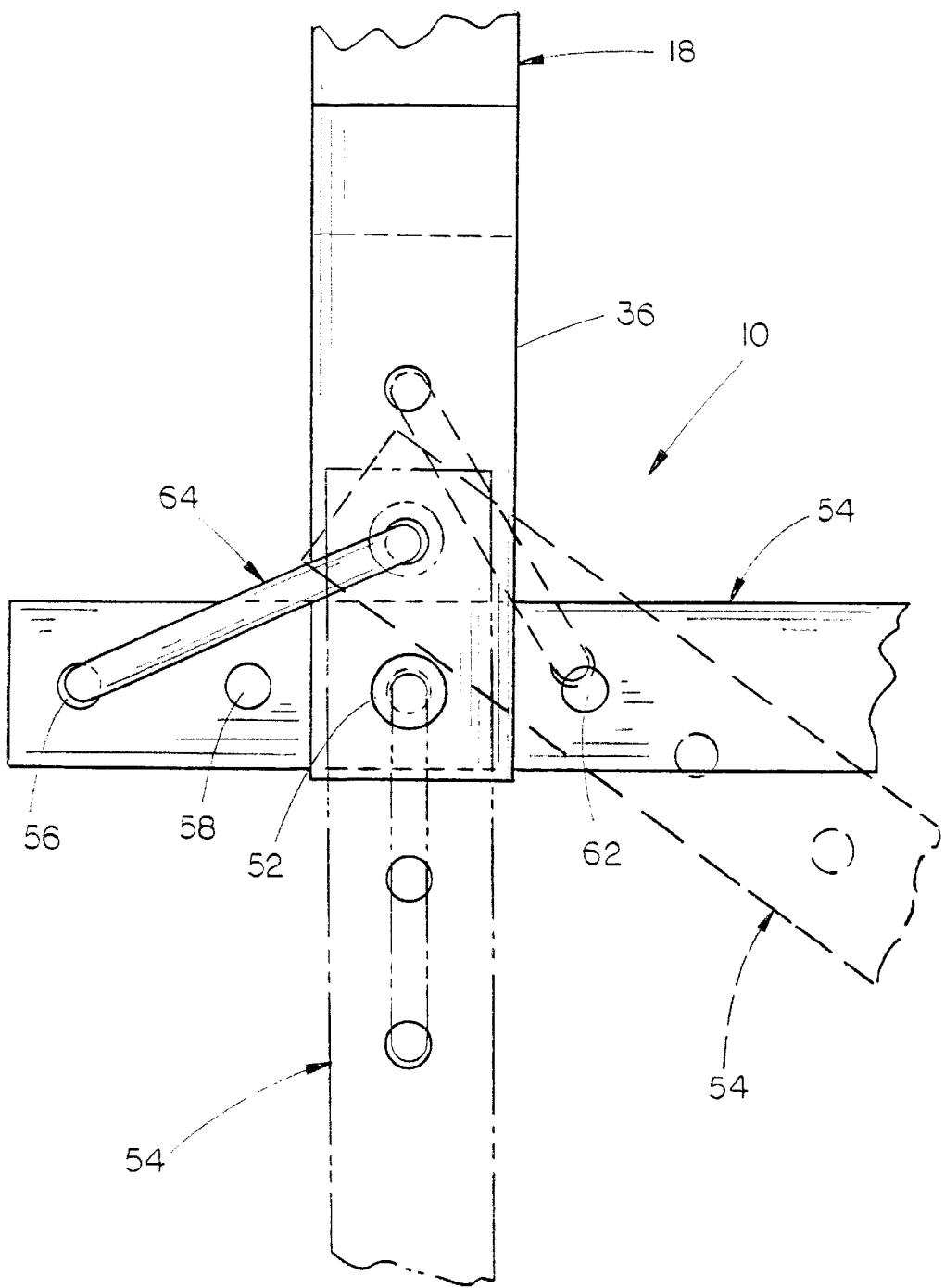
FIG. 4 is a partial top elevational view of the umbrella support illustrating the various adjustment positions.

The umbrella support of this invention is generally designated by the reference numeral 10 and is designed for use with a vehicle 12 having a conventional hitch receiver 14 at the rearward end thereof. In some instances, the hitch receiver 14 may be mounted on the forward end of the vehicle. Hitch receiver 14 has a pair of matching holes formed in the opposite side thereof for receiving a locking pin 16 therein in conventional fashion.

Umbrella support 10 includes a substantially horizontally disposed hitch bar 18 having an inner end 20, outer end 22, top surface 24, bottom surface 26 and opposite sides 28 and 30. The inner end 20 of the hitch bar 18 is selectively received by the hitch receiver 14. Hitch bar 18 is provided with a pair of longitudinally spaced-apart hitch pin openings 32 and 34 formed therein, each of which are adapted to register with the matching holes formed in the receiver 14 so that the locking pin 16 may be extended through the receiver 14 and the hitch bar. Although a pair of the hitch pin openings 32 and 34 are disclosed, more than two of the hitch pin openings could be utilized if so desired. As seen in the drawings, hitch bar 18 is comprised of a hollow tubular member, but the hitch bar 18 could be comprised of a solid bar material if so desired, although the solid construction would add weight to the assembly.

An elongated upper clevis element 36 is welded or otherwise secured to the top surface of the outer end of the hitch bar 18 and extends rearwardly therefrom. The upper clevis element has a plurality of longitudinally spaced-apart openings 38, 40 and 42 formed therein. Although three openings are illustrated as being formed in the upper clevis element 36, additional openings could also be provided therein.

A lower clevis element 44 is welded or otherwise secured to the bottom surface of the outer end of the hitch bar 18 and extends rearwardly therefrom. Lower clevis element 44 is provided with openings 46, 48 and 50 formed therein which register with openings 38, 40 and 42, respectively, in upper clevis element 36. The openings 38, 46; 40, 48; and 42, 50 are adapted to have a hitch pin 52 extended therethrough as will be described in greater detail hereinafter.

Umbrella support 10 also includes an elongated, substantially horizontally disposed bar 54 which has inner and outer ends. The inner end of the support bar 54 is adapted to be received between the upper clevis element 36 and the lower clevis element 44, as seen in the drawings. Support bar 54 has a plurality of longitudinally spaced-apart openings 56, 58, 60 and 62 formed therein which are adapted to register with the openings formed in the upper and lower clevis elements. The hitch pin 52 may be selectively removably extended through one of the openings in the upper clevis element 36, one of the openings in the support bar 54, and one of the openings in the lower clevis element 44.

The numeral 64 refers to a U-shaped locking pin including a base portion 66 and pin members 68 and 70 which extend downwardly from the opposite ends of the base portion 66, as illustrated in the drawings. Preferably, pin member 68 has a shorter length than the pin member 70. The pin member 68 may be selectively extended downwardly through one of the openings in the upper clevis element 36 while the second pin member 70 may be selectively extended downwardly through one of the openings in the support bar 54. As will be described hereinafter, the U-shaped locking member 64 locks the support bar 54 against pivotal movement with respect to the hitch bar 18. A hollow tube 72 is welded or otherwise secured to the outer end of the support bar 54, as illustrated in the drawings. Tube 72 is adapted to removably receive the pole 74 of an umbrella 76 to maintain the pole 74 in an upright condition.

Preferably, the lower end of the tube 72 is open so that the lower end of the pole 74 may rest on the ground. Thus, if weight is placed on the vehicle such as by a person or persons sitting on the bumper or tailgate of the vehicle, the support bar 54 may move downwardly with respect to the pole 74. If desired, the pole 74 may be locked in tube 72 so that the lower end of the pole 74 is not in ground engagement and the same may be accomplished by simply inserting a pin through opening 80 in tube 72 and an opening formed in the pole 74 to limit vertical movement between tube 72 and pole 74.

The umbrella support of this invention enables the umbrella to be positioned in various positions both longitudinally and laterally with respect to the vehicle. For example, the hitch bar may be slightly longitudinally adjusted with respect to the hitch receiver by inserting the locking pin 16 either through the pair of openings 32 or 34. The bar 54 is movable to many different positions, both longitudinally and laterally, with respect to the hitch bar 18. For example, if the pin 52 is extended downwardly through opening 38, opening 56 and opening 46, the tube 72 will be positioned closer to the rear of the vehicle than if the pin 52 were extended downwardly through opening 42, opening 60 and opening 50.

The pin 52 enables the bar 54 to be pivotally moved to various positions with respect to the hitch bar 18. When the hitch bar is pivotally moved to the desired location so that the umbrella will shade the area rearwardly of the vehicle, the locking pin 64 is utilized to maintain the bar 54 in that desired position. Pin member 68 is extended downwardly through one of the openings 38, 40 or 42 and the pin member 70 is inserted downwardly through one of the openings 56, 58, 60 or 62. An infinite number of positions of the bar 54 with respect to the bar 58 are made possible through the openings in the clevis elements 36 and 44 and the openings in the bar 54. Thus, the umbrella may be selectively moved so as to be properly positioned with respect to the vehicle and the sun. As the sun moves during the day, the umbrella support may be longitudinally and pivotally adjusted with respect to the support bar 58 so that the full shading potential of the umbrella is utilized.

The umbrella support of this invention is easily mounted on the hitch receiver of the vehicle and is easily detached therefrom. The configuration of the umbrella support is such that it is easily stowable within the vehicle and may be easily shipped from its place of manufacture to the customer's location.

Although the hitch-mounted support 10 of this invention is ideally suited for supporting an umbrella 76, which is the preferred embodiment, the vertically disposed hollow tube 72 thereof could also be used for supporting a small table or rack having a tube extending downwardly therefrom into the hollow tube and secured thereto by any convenient means.

Thus it can be seen that the invention accomplishes at least all of its stated objectives.

I claim:

1. A hitch-mounted umbrella support for use with a vehicle having a hitch receiver at the rearward end thereof which has matching holes formed in opposite side walls thereof for receiving a locking pin therein, comprising:

a substantially horizontally disposed hitch bar having forward and rearward ends, opposite sides, a top surface and a bottom surface;

said forward end of said hitch bar adapted to be selectively received by the hitch receiver;

said hitch bar having a locking pin opening formed in its forward end which is adapted to register with the matching holes in the receiver to enable said locking pin to be extended through the hitch receiver and the hitch bar;

an elongated upper clevis element, having inner and outer ends, mounted on said top surface of said rearward end of said hitch bar and extending rearwardly therefrom;

said upper clevis element having a plurality of longitudinally spaced-apart openings formed therein;

an elongated lower clevis element, having inner and outer ends, mounted on said bottom surface of said rearward end of said hitch bar and extending rearwardly therefrom;

said lower clevis element having a plurality of longitudinally spaced-apart openings formed therein which match the openings formed in said upper clevis element;

an elongated, substantially horizontally disposed support bar, having inner and outer ends;

said inner end of said support bar being selectively received between said upper and lower clevis elements;

said support bar having a plurality of longitudinally spaced-apart openings formed in its said inner end;

a selectively removable pivot pin extending through one of said openings in said upper clevis element, one of said openings in said support bar, and one of said openings in said lower clevis element;

a substantially U-shaped locking member having an upper base portion and first and second spaced-apart pin members extending downwardly therefrom;

said first pin member selectively removably extending downwardly through one of said openings in said upper clevis element;

said second pin member selectively removably extending downwardly through one of said openings in said support bar;

said U-shaped locking member locking said support bar against pivotal movement with respect to said hitch bar;

and a hollow upstanding tube having upper and lower ends secured to said support bar at said outer end thereof for removably receiving the pole of an umbrella therein.

2. The umbrella support of claim 1 wherein said hollow upstanding tube extends upwardly from said outer end of said support bar.

3. The umbrella support of claim 2 wherein said lower end of said hollow tube is open to permit the pole of the umbrella to rest upon the ground.

4. The umbrella support of claim 2 further including means to secure the pole of the umbrella to said hollow upstanding tube.

5. The umbrella support of claim 1 wherein said support bar comprises a hollow tubular member.

6. The umbrella support of claim 1 wherein said hitch bar comprises a hollow tubular member.

7. The umbrella support of claim 1 wherein said hitch bar has a plurality of longitudinally spaced-apart locking pin openings formed therein to permit the selective longitudinal positioning of said hitch bar with respect to the hitch receiver.

8. A hitch-mounted support for use with a vehicle having a hitch receiver at the rearward end thereof which has matching holes formed in opposite side walls thereof for receiving a locking pin therein, comprising:

a substantially horizontally disposed hitch bar having forward and rearward ends, opposite sides, a top surface and a bottom surface;

said forward end of said hitch bar adapted to be selectively received by the hitch receiver;

said hitch bar having a locking pin opening formed in its forward end which is adapted to register with the matching holes in the receiver to enable said locking pin to be extended through the hitch receiver and the hitch bar;

an elongated upper clevis element, having inner and outer ends, mounted on said top surface of said rearward end of said hitch bar and extending rearwardly therefrom;

said upper clevis element having a plurality of longitudinally spaced-apart openings formed therein;

an elongated lower clevis element, having inner and outer ends, mounted on said bottom surface of said rearward end of said hitch bar and extending rearwardly therefrom;

said lower clevis element having a plurality of longitudinally spaced-apart openings formed therein which match the openings formed in said upper clevis element; an elongated, substantially horizontally disposed support bar, having inner and outer ends;

said inner end of said support bar being selectively received between said upper and lower clevis elements;

said support bar having a plurality of longitudinally spaced-apart openings formed in its said inner end;

a selectively removable pivot pin extending through one of said openings in said upper clevis element, one of said openings in said support bar, and one of said openings in said lower clevis element;

a substantially U-shaped locking member having an upper base portion and first and second spaced-apart pin members extending downwardly therefrom;

said first pin member selectively removably extending downwardly through one of said openings in said upper clevis element;

said second pin member selectively removably extending downwardly through one of said openings in said support bar;

said U-shaped locking member locking said support bar against pivotal movement with respect to said hitch bar;

and a hollow upstanding tube having upper and lower ends secured to said support bar at said outer end thereof for removably receiving a support tube of an item.

* * * * *